US012766541B2

(12) United States Patent
Zhang

(10) Patent No.: US 12,766,541 B2
(45) Date of Patent: Oct. 20, 2026

(54) DISPENSING DEVICE FOR LITHIUM-ION BATTERY (LIB) SEPARATOR

(71) Applicant: Shanghai Foresight Smart Equipment Co., Ltd., Shanghai (CN)

(72) Inventor: Nianfu Zhang, Shanghai (CN)

(73) Assignee: Shanghai Foresight Smart Equipment Co., Ltd., Shanghai (CN)

( * ) Notice: Subject to any disclaimer, the term of this patent is extended or adjusted under 35 U.S.C. 154(b) by 512 days.

(21) Appl. No.: 18/279,071

(22) PCT Filed: Oct. 20, 2022

(86) PCT No.: PCT/CN2022/126345
§ 371 (c)(1),
(2) Date: Aug. 28, 2023

(87) PCT Pub. No.: WO2023/159982
PCT Pub. Date: Aug. 31, 2023

(65) Prior Publication Data

US 2025/0010326 A1 Jan. 9, 2025

(30) Foreign Application Priority Data

Feb. 28, 2022 (CN) ........................ 202210192239.8

(51) Int. Cl.
*B05C 1/08* (2006.01)
*H01M 10/0525* (2010.01)
(Continued)

(52) U.S. Cl.
CPC .......... *B05C 1/0834* (2013.01); *B05C 1/0808* (2013.01); *B05C 1/083* (2013.01);
(Continued)

(58) Field of Classification Search
USPC .......................................................... 118/249
See application file for complete search history.

(56) References Cited

U.S. PATENT DOCUMENTS 3,407,084 A * 10/1968 Heywood ............... B31B 70/62
427/428.17
3,707,135 A * 12/1972 Sharpe .................... B65C 11/04
118/244

(Continued)

FOREIGN PATENT DOCUMENTS

CN 101925462 A 12/2010
CN 107649330 A 2/2018

(Continued)

*Primary Examiner* — Jethro M. Pence
(74) *Attorney, Agent, or Firm* — Bayramoglu Law Offices LLC

(57) ABSTRACT

A dispensing device for a lithium-ion battery (LIB) separator mainly includes a coating adhesive transferring device, a feed amount controller, and a planar bottom roll. The coating adhesive transferring device includes an adhesive accommodating device and a relief roll. Accommodating grooves for accommodating adhesives are provided on the adhesive accommodating device. Transferring protrusions are arranged on a rolling surface of the relief roll. The relief roll is located between the adhesive accommodating device and the planar bottom roll. The transferring protrusions are inserted into the accommodating grooves at a place where the relief roll contacts the adhesive accommodating device. The feed amount controller is configured to detect and control the feed amounts when the transferring protrusions are inserted into the accommodating grooves. The planar bottom roll is located tinder the relief roll. A film passing gap is provided between the planar bottom roll and the relief roll.

15 Claims, 5 Drawing Sheets

(51) Int. Cl.
*H01M 50/403* (2021.01)
*H01M 50/46* (2021.01)

(52) U.S. Cl.
CPC ....... *B05C 1/0882* (2013.01); *H01M 10/0525* (2013.01); *H01M 50/403* (2021.01); *H01M 50/461* (2021.01)

(56) References Cited

U.S. PATENT DOCUMENTS

| | | | | |
|---|---|---|---|---|
| 3,789,795 | A * | 2/1974 | Brandenburg | B31F 1/2818 118/204 |
| 6,638,605 | B1 * | 10/2003 | Ankuda, Jr. | B05C 1/0808 428/95 |
| 7,252,855 | B2 * | 8/2007 | Haskett | B05D 3/12 427/256 |
| 2017/0157966 | A1 * | 6/2017 | Becker | B41F 5/24 |

FOREIGN PATENT DOCUMENTS

| | | | |
|---|---|---|---|
| CN | 213194316 | U | 5/2021 |
| CN | 114833017 | A | 8/2022 |
| CN | 115025924 | A | 9/2022 |
| CN | 115069480 | A | 9/2022 |
| CN | 217664253 | U | 10/2022 |
| CN | 217691530 | U | 10/2022 |
| EP | 2572883 | A2 | 3/2013 |
| JP | 2011206698 | A | 10/2011 |
| JP | 2016219100 | A | 12/2016 |
| JP | 2020185792 | A | 11/2020 |
| WO | 2012027196 | A1 | 3/2012 |
| WO | 2015078550 | A1 | 6/2015 |
| WO | 2021209281 | A1 | 10/2021 |

* cited by examiner

DISPENSING DEVICE FOR LITHIUM-ION BATTERY (LIB) SEPARATOR

CROSS REFERENCE TO THE RELATED APPLICATIONS

This application is the national phase entry of International Application No. PCT/CN2022/126345, filed on Oct. 20, 2022, which is based upon and claims priority to Chinese Patent Application No. 202210192239.8, filed on Feb. 28, 2022, the entire contents of which are incorporated herein by reference.

TECHNICAL FIELD

The present disclosure relates to the technical field of lithium-ion battery (LIB) separator preparation and in particular to a dispensing device for an LIB separator.

BACKGROUND

In the manufacturing fields of separators and electrodes in the battery industry, air-permeable films and non-woven fabrics in the sanitary packaging industry, and protective films in the electronic industry, incompletely covered coating layers are formed necessarily by dispensing.

With separator preparation in the battery industry as an example, desirable thermostability and adhesive strength between the separator and the electrode as well as quick charge performance are of importance to the LIB. Through incompletely covered coating adhesive layers, recessed regions at adhesive points without a polymer can implement effective transmission of lithium ions and improve the conductivity of lithium ions on the separator, thereby improving the charge-discharge performance of the LIB and prolonging cycle life of the LIB.

An incompletely covered coating adhesive layer typically used for preparing an LIB separator in the prior art includes a polyvinylidene fluoride-aggregating shrunk coating film and an "island" PVDF spraying film, wherein the polyvinylidene fluoride (PVDF) is a highly non-reactive thermoplastic fluoropolymer. For the polyvinylidene fluoride-aggregating shrunk coating film, with the hydrophobicity of the PVDF, the surface of the separator makes the PVDF is transformed into an aggregate by adjusting the tension of the slurry. Once the slurry contacts the surface of the separator, the aggregate is shrunk quickly to prevent continuity. Due to the adjustment of the slurry, the separator has undesirable stability. For the "island" PVDF spraying film, the PVDF is thrown onto the separator through high-speed rotation to form island structures on the separator so that electrodes are riveted. However, the shape is irregular. Hence, existing incompletely covered coating adhesive layers for preparing the LIB separator are presented with various problems.

As described above, the existing incompletely covered coating adhesive layers for preparing the LIB separator cannot accurately control the size, distance, and aggregation state of the adhesive point, and the resulting discrete adhesive film layer is unfavorable to have control on the production quality and the subsequent roll winding quality. Therefore, the present disclosure provides a solution for preparing an incompletely covered coating separator (which is different from the prior art) to form flat and size-consistent local coating structures, thereby achieving a uniform "point-like" PVDF coating film.

As illustrated in FIG. 1, coating adhesive is fully coated in recesses or grooves 011 on a rolling surface of anilox roll 01, and liquid film layers of a uniform thickness are formed. While protrusions 021 on relief roll 02 make contact with the anilox roll 01, the liquid film layers are transferred to transferring surfaces of the protrusions 021. During the transferring process, the transferring surfaces of the protrusions 021 tangentially contact the rolling surface of the anilox roll 01. At last, a planar bottom roll 03 is used to squeeze the transferring surfaces of the protrusions 021 on the relief roll 02, such that the liquid film layers on the transferring surfaces of the protrusions 021 are transferred to separator 04 which passes through a gap between the planar bottom roll 03 and the relief roll 02 and moves along direction j, and thus uniform "point-like" coating layers are formed at the side of the separator 04, wherein the side facing toward the relief roll 02.

The above solution for preparing the uniform "point-like" dispensing separator can form flat and size-consistent local coating structures on the separator, but only thin liquid film layers can be formed (for example, the thickness of coating films is less than 5 μm). The above solution cannot meet the requirements of thick coating films (for example, the thickness of coating films is greater than 10 μm). In addition, different types of separators require different thicknesses of liquid films. According to the existing solution, the dispensing thicknesses can only be adjusted by replacing different versions of intaglio rolls, which causes a high cost, a troublesome operation, and a waste of time.

SUMMARY

To prepare thick coating layers on a coating film in the battery field, sanitary packaging industry, and electronic industry, the present disclosure provides a dispensing device for an LIB separator. The dispensing device for an LIB separator includes a coating adhesive transferring device, a feed amount controller, and a planar bottom roll. The coating adhesive transferring device includes an adhesive accommodating device and a relief roll. Accommodating grooves for storing and accommodating adhesive are provided on the adhesive accommodating device. Transferring protrusions are arranged on the rolling surface of the relief roll. The transferring protrusions are inserted into corresponding ones of the accommodating grooves on the adhesive accommodating device to transfer a separator coating adhesive. The separator coating adhesive forms coating adhesive droplets covering transferring end surfaces of the transferring protrusions. The planar bottom roll rotates reversely relative to the adhesive accommodating device, such that a coating film is driven to move and the coating adhesive droplets on the transferring protrusions drip onto the coating film to form incompletely covered coating layers on the coating film. Preferably, the adhesive accommodating device is an anilox roll, a textured roll, or a smooth roll.

Further, when the dispensing device for an LIB separator is used to dispense the coating adhesive on the coating film to form the coating layers, the coating adhesive in a hopper is transferred to the accommodating grooves on the anilox roll, and liquid film layers of a uniform thickness are formed in the accommodating grooves on the rolling surface of the anilox roll. By rotating the relief roll and the anilox roll, the transferring protrusions on the relief roll are inserted into the accommodating grooves on the anilox roll and moved away from the accommodating grooves with rotation of the relief roll and the anilox roll. Meanwhile, the coating adhesive is brought out of the accommodating grooves through the tension of the coating adhesive, thereby forming approximately spherical or ellipsoidal coating adhesive droplets at transferring ends of the transferring protrusions. When the transferring protrusions having the coating adhesive droplets are transposed with front sides facing toward the coating film passing through a film passing gap, the coating adhesive droplets drip onto the coating film under the action of a tension difference to form the incompletely covered coating layers on the coating film. It is to be noted that the coating adhesive droplets mainly drip with the tension difference between the relief roll and the coating film. The larger the tension difference, the better the dripping effect. Those skilled in the art also know that gravities of the coating adhesive droplets and centrifugal forces formed with rotation of the relief roll also have certain impacts on the coating adhesive droplets to drip onto the coating film.

Further, the dispensing device includes the feed amount controller and the planar bottom roll. The feed amount controller is configured to detect and control feed amounts when the transferring protrusions on the relief roll are inserted into the accommodating grooves. The planar bottom roll is located under the relief roll. A film passing gap for allowing the coating film to pass through is provided between the planar bottom roll and the relief roll. When the dispensing device is used to dispense the coating adhesive on the coating film to form the coating layers, the coating adhesive in a hopper is transferred to the accommodating grooves on the anilox roll, and liquid film layers of a uniform thickness are formed in the accommodating grooves on the rolling surface of the anilox roll. By rotating the relief roll and the anilox roll, the transferring protrusions on the relief roll are inserted into the accommodating grooves on the anilox roll and moved away from the accommodating grooves with rotation of the relief roll and the anilox roll. Meanwhile, the coating adhesive is brought out of the accommodating grooves with the tension of the coating adhesive, thereby forming approximately spherical or ellipsoidal coating adhesive droplets at the transferring ends of the transferring protrusions. When the transferring protrusions having the coating adhesive droplets are transposed with front sides facing toward the coating film passing through the film passing gap, the coating adhesive droplets drip onto the coating film under the action of a tension difference to form the incompletely covered coating layers on the coating film. In addition, during preparation, the feed amounts when the transferring protrusions on the relief roll are inserted into the accommodating grooves on the anilox roll are controlled through the feed amount controller, thereby controlling the thicknesses of the coating layers. Experiments show that the thicknesses of the coating layers formed on the coating film with the dispensing device for an LIB separator fall into a range between 2 μm and 30 μm. Compared with existing coating layers having thicknesses less than 5 μm, the thicknesses of the formed coating layers of the present disclosure are greater and are controlled simply and conveniently.

Further, the dispensing device for an LIB separator may include an application device, where the application device abuts against the adhesive accommodating device, such that the coating adhesive forms liquid film layers of a uniform thickness on the surface of the adhesive accommodating device. Preferably, the application device includes a roller or a blade. In response to the roller, a rolling surface of the roller close to the anilox roll contacts and squeezes the coating adhesive on the rolling surface of the anilox roll to remove excess coating adhesive, thereby forming the liquid film layers of uniform thickness in anilox cells in the rotation of the anilox roll. In response to the blade, the blade is close to the rolling surface of the anilox roll. During the rotation of the anilox roll, the blade scrapes the coating adhesive from the rolling surface of the anilox roll to remove excess coating adhesive, thereby forming the liquid film layers of uniform thickness in the anilox cells of the anilox roll.

Preferably, the ratios of inner diameters d1 of the accommodating grooves to diameters d2 of the transferring end surfaces of the transferring protrusions are greater than or equal to 1.5. Areas of the transferring end surfaces of the transferring protrusions are far less than the cross-sectional areas of the accommodating grooves, such that the transferring end surfaces of the transferring protrusions are conveniently inserted into the accommodating grooves of the anilox roll. With the tension of the coating adhesive, the coating adhesive is attached to the transferring end surfaces of the transferring protrusions to form the spherical or ellipsoidal coating adhesive droplets. The coating adhesive droplets do not squeeze the coating film in the transferring process but mainly drip onto the coating film under the action of the tension difference of the coating adhesive droplets on the relief roll and the coating film made of different materials. Further, the transferring end surfaces of the transferring protrusions are circular. The diameters d2 of the transferring end surfaces fall into a range between 20 μm and 1 mm. When the transferring protrusions are inserted into the accommodating grooves, spacings L between the transferring end surfaces and bottoms of the accommodating grooves fall into a range between 20 μm and 250 μm. When the dispensing device for an LIB separator is used to form the incompletely covered coating layers on the coating film, transferring of the coating adhesive is not affected by the small or large transferring end surfaces of the transferring protrusions. Meanwhile, the depths that the transferring protrusions are inserted into the accommodating grooves, namely the spacings L between the transferring end surfaces and the bottoms of the accommodating grooves, can be adjusted, thereby adjusting the heights of the coating adhesive droplets on the transferring protrusions and adjusting the thicknesses of the coating layers according to the heights of the coating adhesive droplets. Therefore, when the dispensing device is used to form the incompletely covered coating layers on the coating film, not only is the coating adhesive on the anilox roll transferred conveniently but also the thicknesses of the coating layers are controlled by an operator conveniently.

Preferably, the transferring protrusions each are a generatrix recessed frustum structure, a generatrix protruded frustum structure, a frustum structure, or a staircase structure. The staircase structure includes a connecting base and a transferring boss; the cross-sectional area of the transferring boss is less than that of the connecting base. Further, the transferring boss is a cylindrical structure, and the connecting base is a frustum structure. The cylindrical structure has a height h1≤200 μm, and the ratio N of the height h1 of the cylindrical structure to the diameter d2 of each of the transferring end surfaces is less than or equal to 2.5. In this way, neither the transferring effect nor the subsequent coating effect is affected by the elongated transferring bosses when the transferring protrusions transfer the adhesive.

Preferably, the feed amount controller may be a grating ruler or other high-precision measurement device. The grating ruler as the feed amount controller is installed and operated simply and conveniently, has high detection and control precision, and facilitates the control of the operator on the thicknesses of the coating layers.

The present disclosure has the following advantages:

When the dispensing device for an LIB separator is used to form the incompletely covered coating layers on the coating film, since the liquid film layers formed by the coating adhesive in the accommodating grooves of the anilox roll have a uniform thickness, thicknesses of the coating layers are stable and uniform. When the coating adhesive is transferred, the transferring protrusions on the relief roll are inserted into the accommodating grooves on the anilox roll, and the coating adhesive is brought out of the accommodating grooves under the action of the tension of the coating adhesive to form the coating adhesive droplets at transferring ends of the transferring protrusions, and thus, the coating adhesive is transferred conveniently. Meanwhile, feed amounts when the transferring protrusions are inserted into the accommodating grooves are adjusted with the feed amount controller according to a coating requirement, which facilitates control of the heights of the coating adhesive droplets and control of the thicknesses of the coating layers. While the coating film moves, the coating adhesive droplets on the transferring protrusions drip onto the coating film, and the coating points are formed on the coating film mainly under the action of the tension difference of the coating adhesive on the relief roll and the coating film made of different materials, which can prevent the coating adhesive droplets from being stressed in coating to reduce the thicknesses of the coating layers, ensures the thicknesses of the coating layers, properly increases areas of the coating points with the coating adhesive at sides of the transferring protrusions and improves coverage rates of the coating layers on the coating film. In the preparation field of the LIB separator, there is no such coating method applied to the production of the LIB separator.

BRIEF DESCRIPTION OF THE DRAWINGS

FIG. 6A is a schematic structural view illustrating a transferring protrusion of a generatrix recessed frustum structure; FIG. 6B is a schematic structural view illustrating a transferring protrusion of a generatrix protruded frustum structure; FIG. 6C is a schematic structural view illustrating a transferring protrusion of a frustum structure; and FIG. 6D is a schematic structural view illustrating a transferring protrusion of a staircase structure;

FIG. 7A is a front view illustrating a transferring protrusion of a generatrix recessed frustum structure; FIG. 7B is a front view illustrating a transferring protrusion of a generatrix protruded frustum structure; FIG. 7C is a front view illustrating a transferring protrusion of a frustum structure; and FIG. 7D is a front view illustrating a transferring protrusion of a staircase structure;

FIG. 8A is a front view illustrating a transferring protrusion of a generatrix recessed frustum structure having a coating adhesive droplet; FIG. 8B is a front view illustrating a transferring protrusion of a generatrix protruded frustum structure having a coating adhesive droplet; FIG. 8C is a front view illustrating a transferring protrusion of a frustum structure having a coating adhesive droplet; and FIG. 8D is a front view illustrating a transferring protrusion of a staircase structure having a coating adhesive droplet.

Figures 6A, 6B, 6C, 6D:
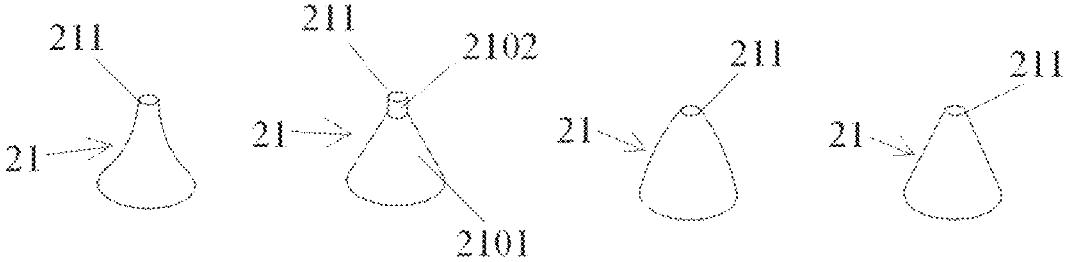
FIGS. 6A-6D are schematic structural views illustrating transferring protrusions in the dispensing device for an LIB separator in FIG. 4, where
Figures 7A, 7B, 7C, 7D:
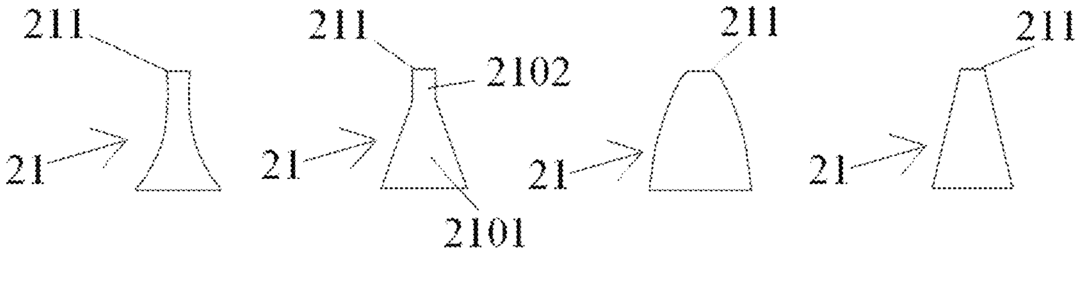
FIGS. 7A-7D are front views illustrating the transferring protrusions in FIGS. 6A-6D, where
Figures 8A, 8B, 8C, 8D:
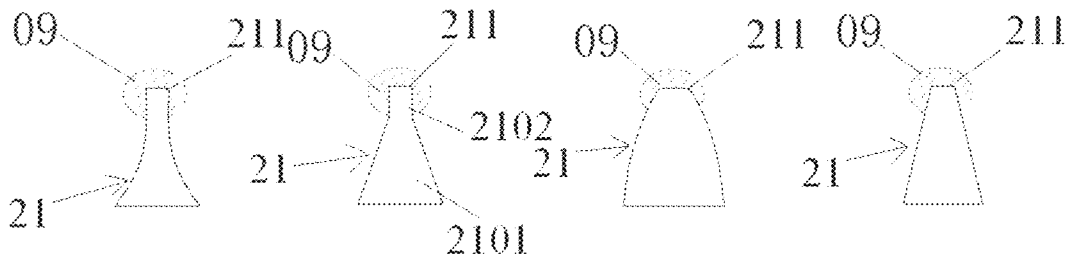
FIGS. 8A-8D are front views illustrating the transferring protrusions having a coating adhesive droplet in FIGS. 6A-6D, where

The original FIG. 6A (FIG. 7A, FIG. 8A) corresponds to a "generatrix recessed frustum structure";

The original FIG. 6C (FIG. 7C, FIG. 8C) corresponds to a "generatrix protruded frustum structure"; The original FIG. 6D (FIG. 7D, FIG. 8D) corresponds to a "frustum structure"; and The original FIG. 6B (FIG. 7B, FIG. 8B) corresponds to a "staircase structure".

In the figures: 01—anilox roll, 011—groove, 02—relief roll, 021—protrusion, 03—planar bottom roll, 04—separator, and 05—coating layer;

1—anilox roll, 11—accommodating groove, 2—relief roll, 3—planar bottom roll, 31—film passing gap, 4—coating film, 5—second micro-adjustment platform, 6—second feed amount controller, 7—first micro-adjustment platform, 8—first feed amount controller, 09—coating adhesive droplet, and 9—coating point; and 10—abrasion detection device;

21—transferring protrusion, 211—transferring end surface, 2101—connecting base, and 2102—transferring boss.

DETAILED DESCRIPTION OF THE EMBODIMENTS

As described in the background, the solution for preparing an incompletely covered coating separator researched by the inventor initially can form flat and uniform local coating structures on the separator but can only form thin liquid film layers (e.g., coating films with thicknesses less than 5 μm) and cannot meet preparation requirements of the thick coating film (e.g., coating films with thicknesses greater than 10 μm).

Through repeated experiments and in-depth studies, it is found by the inventor that the initially searched solution for preparing an incompletely covered coating separator mainly follows technical concepts in printing. To form controllable liquid film layers on the transferring surfaces of the protrusions 021 on the relief roll 02 in the transferring process, areas of the transferring surfaces of the protrusions 021 are far greater than those of the recesses or grooves 011 on the anilox roll 01, that is, the areas of the transferring surfaces of the protrusions 021 are far greater than those of the liquid film layers formed in the cells, recesses, or grooves 011 on the anilox roll 01. This is the main reason that the thick coating film cannot be formed easily. More details will be described below.

Figure 1:
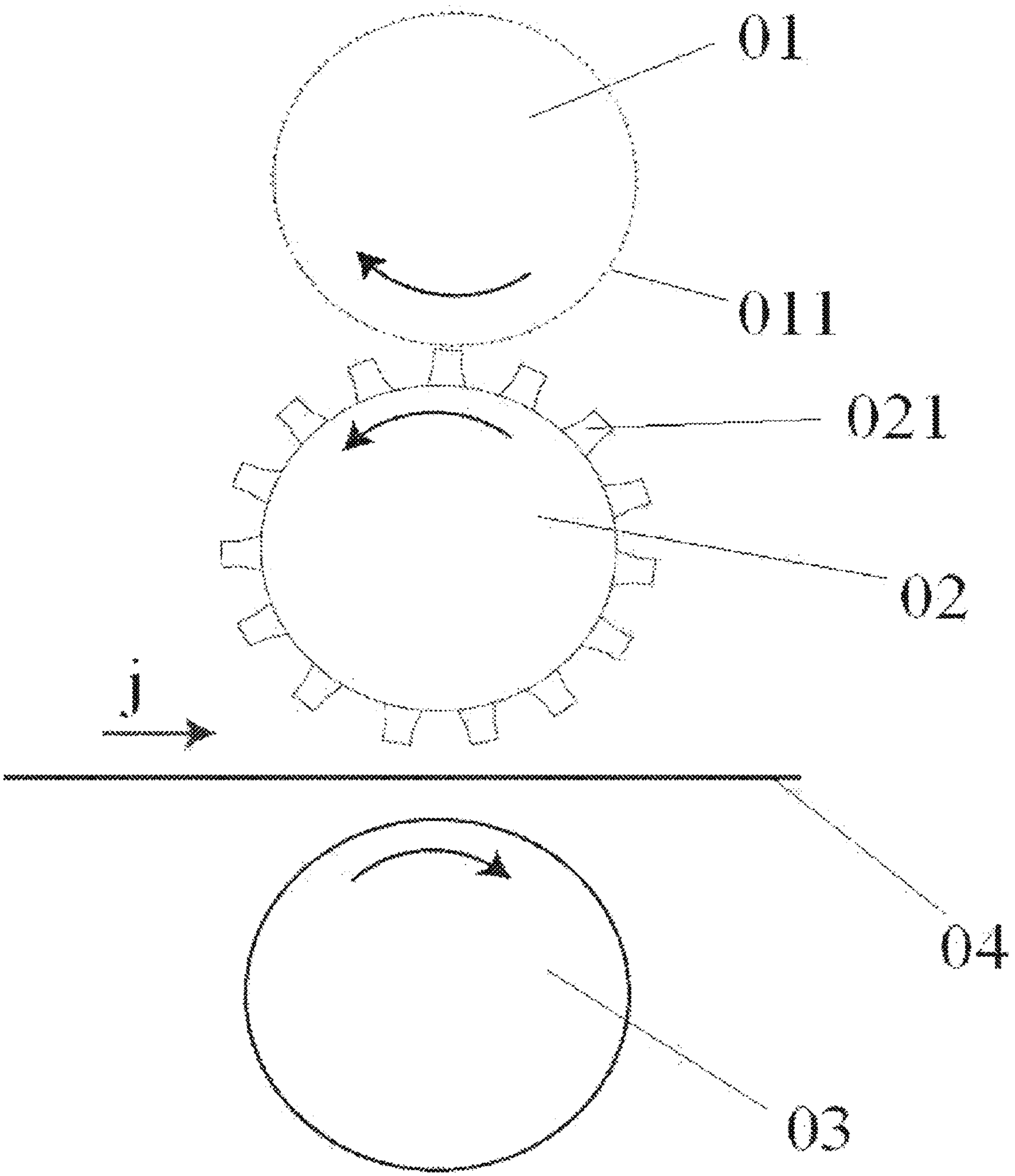
FIG. 1 is a schematic view of a preparation device used by a method for preparing incompletely covered coating layers in the prior art.
Figure 2:
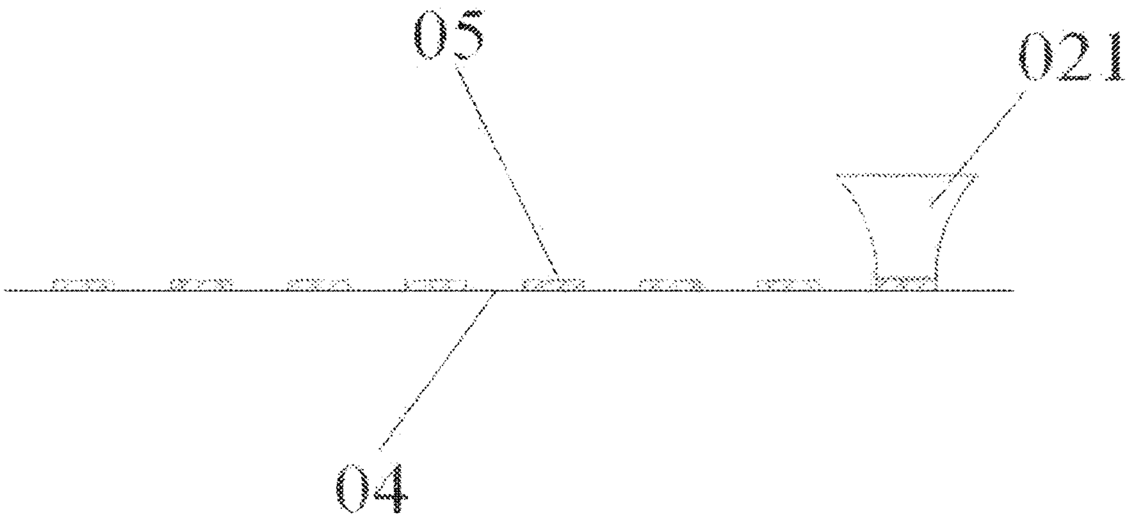
FIG. 2 is a schematic view for preparing thin incompletely covered coating layers.
Figure 3:
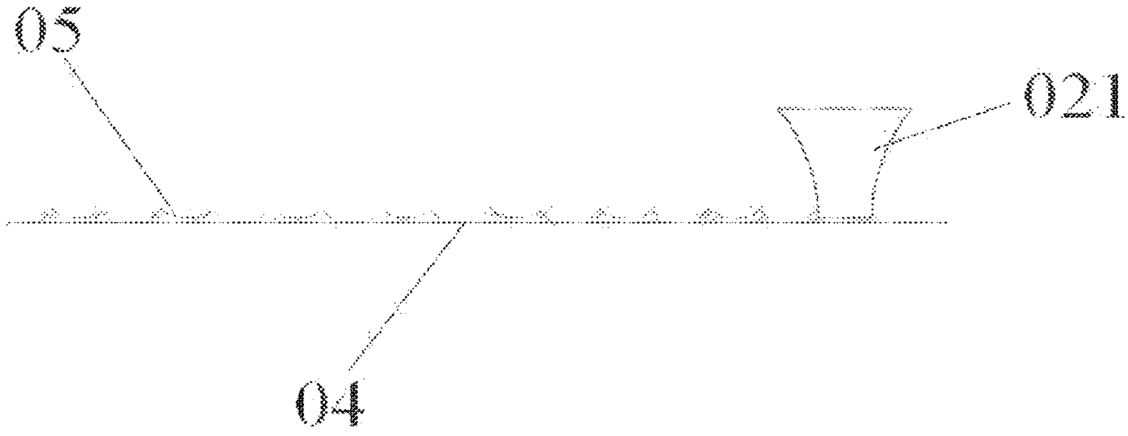
FIG. 3 is a schematic view for preparing thick incompletely covered coating layers.

FIGS. 2-3 are schematic views for preparing thin and thick coating layers in research and development. As shown in FIG. 2, when the coating adhesive droplets are dispensed with the protrusions 021, only a small amount of the coating adhesive can be obtained through the protrusions 021. Since areas of the coating adhesive droplets are the same as those of the transferring surfaces of the protrusions 021, only a coating layer 05 having a thickness lesser than 10 μm can be formed on the separator 04. As shown in FIG. 3, since the liquid film layers are transferred to the separator 04 from the relief roll 02 by pressing, the liquid film layers are flattened in the transferring process. Particularly, when the liquid film layers each have a large thickness, such as greater than 5 μm, the coating layers 05 with recesses in the centers are formed on the separator 04 as shown in FIG. 3, and thus the control on thicknesses of the coating layers is tricky or even the coating layers cannot be formed.

It is to be noted that the dispensing solution is not the prior art, but only a specific implementation in the research and development. Therefore, it is unlikely for those skilled in the art to know the above technical problem, that is, the technical problem is unapparent to those skilled in the art.

As described above, concerning the initially searched solution for preparing an incompletely covered coating separator, since the areas of the protrusions on the relief roll are far greater than those of the recesses or grooves on the anilox roll, the protrusions cannot obtain the coating adhesive on the anilox roll unless contacting the anilox roll, the protrusions cannot select the large coating adhesive droplets, and thus only the thin liquid film layers can be formed in dispensing. On the other hand, even though the intaglio roll (anilox roll) is replaced to obtain a larger amount of the coating adhesive, the method for transferring the liquid film layers from the anilox roll to the separator by pressing to form coating adhesive points (or referred to as "coating points") is still difficult to ensure a certain thickness.

Given this, the present disclosure provides a technical solution to solve the above problem. By changing the shapes of the protrusions on the relief roll, the protrusions can be inserted into the grooves on the intaglio roll (anilox roll) to obtain more adhesive. The coating adhesive on the protrusions drips onto the coating film. Coating points are formed on the coating film mainly under the action of the tension difference of the coating adhesive on different materials.

The present disclosure further provides a solution to adjust feed amounts when the protrusions on the relief roll are inserted into the grooves on the intaglio roll (anilox roll) and adjust the spacing between the relief roll and the coating film, thereby controlling thicknesses and shapes of adhesive points dripped by the coating adhesive droplets on the coating film. This solution solves the above-identified problems of different types of separators requiring different thicknesses of liquid films and the dispensing thicknesses can only be adjusted by replacing different versions of intaglio rolls, causing a high cost, a troublesome operation, and a waste of time.

An embodiment of the present disclosure takes dispensing in preparation of an LIB separator as an example for description. It is to be understood by those skilled in the art that the dispensing device and dispensing method in the present disclosure apply to not only the preparation of the LIB separator but also the preparation of relevant film layers in other industries (such as manufacturing field of air-permeable films and non-woven fabrics in the sanitary packaging industry and manufacturing field of protective films in electronic industry).

Figure 4:
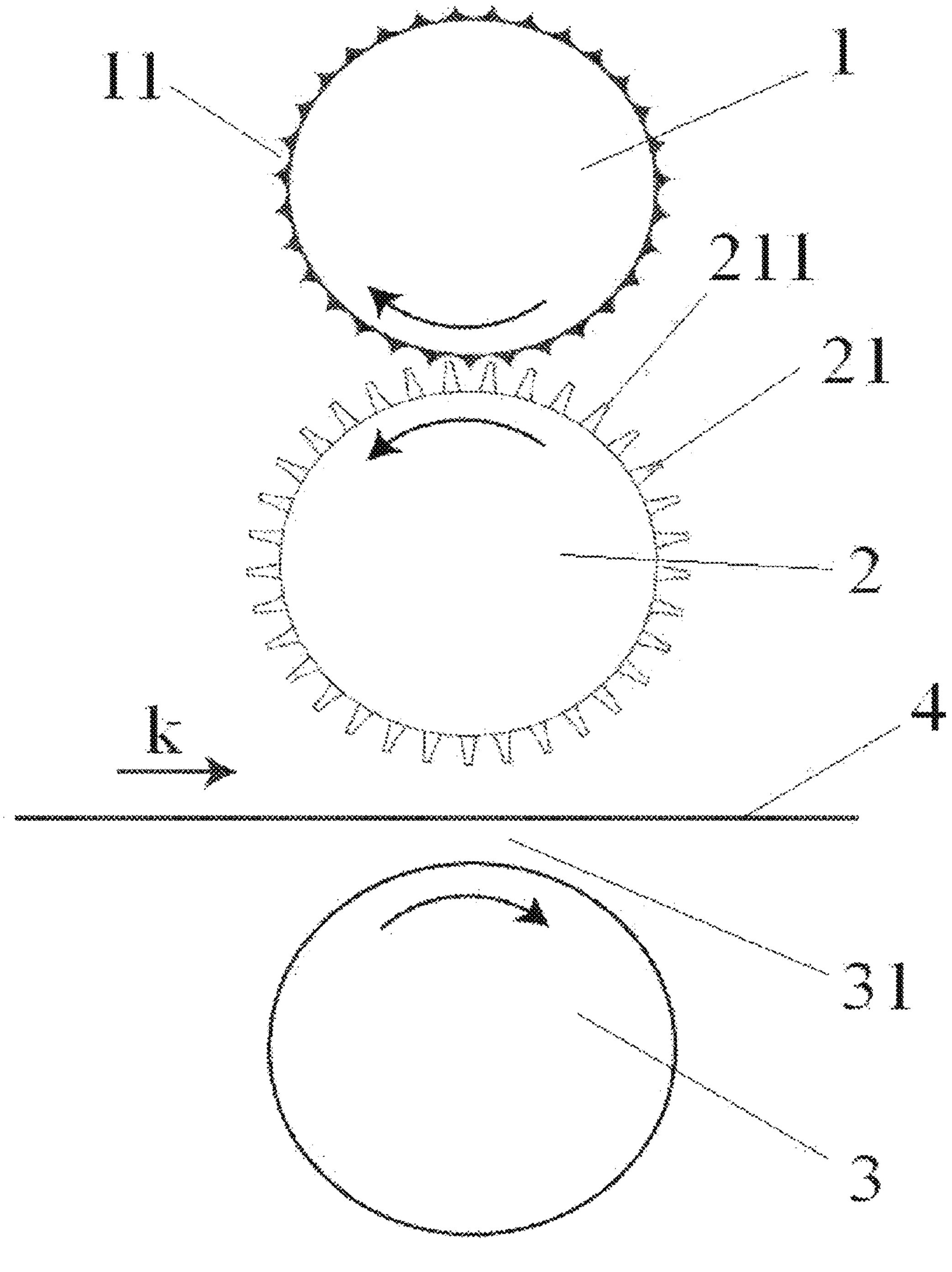
FIG. 4 is a schematic structural view of a dispensing device for an LIB separator according to the present disclosure.

As shown in FIG. 4, a dispensing device provided by the embodiment of the present disclosure includes anilox roll 1 (adhesive accommodating device), relief roll 2, feed amount controller (not shown in the figure), and planar bottom roll 3. The relief roll 2 is located between the anilox roll 1 and the planar bottom roll 3. The planar bottom roll 3 is located under the relief roll 2. Film passing gap 31 for allowing coating film 4 to pass through is provided between the planar bottom roll 3 and the relief roll 2. Accommodating grooves 11 for accommodating a coating adhesive are provided on a rolling surface of the anilox roll 1. The accommodating grooves 11 are circular and uniformly arranged on the rolling surface of the anilox roll 1. When the coating adhesive is coated on the rolling surface of the anilox roll 1, excess coating adhesive on the rolling surface of the anilox roll 1 can be removed by squeezing or scraping to form liquid film layers (not shown in the figure) of a uniform thickness in anilox cells or grooves. Transferring protrusions 21 are arranged on a rolling surface of the relief roll 2. At a place where the relief roll 2 contacts the anilox roll 1, the transferring protrusions 21 are inserted into corresponding ones of the accommodating grooves 11 on the anilox roll 1. When the coating adhesive is coated on the rolling surface of the anilox roll 1 and the relief roll 2 rotates reversely relative to the anilox roll, the transferring protrusions 21 are inserted into the accommodating grooves 11 to bring the coating adhesive out of the accommodating grooves 11, thereby forming spherical or ellipsoidal coating adhesive droplets 09 at transferring end surfaces 211 of the transferring protrusions 21.

Preferably, when the transferring protrusions 21 on the relief roll 2 are inserted into the accommodating grooves 11 on the anilox roll 1 to transfer the coating adhesive, spacings L between the transferring end surfaces 211 of the transferring protrusions 21 and the bottoms of the accommodating grooves 11 have sizes in the range between 20 μm and 250 μm. When the dispensing device for an LIB separator provided by the present disclosure is used to form incompletely covered coating layers on the coating film, the heights of the coating adhesive droplets 09 on the transferring protrusions 21 can be adjusted with the depths that the transferring protrusions 21 are inserted into the accommodating grooves 11, namely with the spacings L between the transferring end surfaces 211 of the transferring protrusions 21 and the bottoms of the accommodating grooves 11. The heights of the coating adhesive droplets 09 refer to the distances from the coating adhesive droplets 09 furthest away from the transferring end surfaces 211 of the transferring protrusions 21 along central axes of the transferring protrusions 21 to the transferring end surfaces 211. Therefore, the thicknesses of the coating layers are adjusted according to the heights of the coating adhesive droplets 09, which facilitates the control of an operator on the thicknesses of the coating layers.

Figure 5:
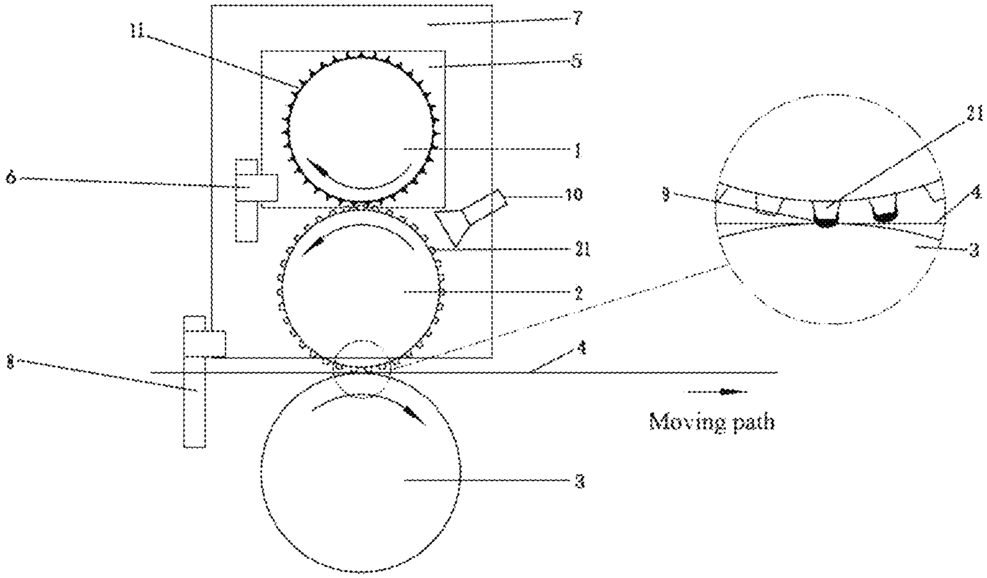
FIG. 5 is a schematic view of a dispensing device including a dispensing control device in dispensing; wherein an abrasion detection device is identified as reference numeral (10) in FIG. 5.

FIG. 5 illustrates a dispensing control device included in the dispensing device. The dispensing control device mainly includes first micro-adjustment platform 7, first feed amount controller 8, second micro-adjustment platform 5, second feed amount controller 6, abrasion detection device (not shown in the figure), and first and second driving control devices (not shown in the figure). The second driving control device is configured to drive the intaglio roll 1 and the relief roll 2 to rotate reversely, such that the transferring protrusions 21 are sequentially inserted into the accommodating grooves 11 and the coating adhesive is brought out of the accommodating grooves 11 to form the coating adhesive droplets 09 covering the transferring end surfaces 211 of the transferring protrusions. The second feed amount controller 6 is configured to detect feed amounts when the transferring protrusions 21 are inserted into the accommodating grooves 11 for accommodating the coating adhesive and control the second micro-adjustment platform 5 according to a coating requirement to adjust the feed amounts. A second display and storage device (not shown in the figure) displays and stores values of the adjusted feed amounts. The shapes of the coating adhesive droplets 09 correspond to the adjusted feed amounts. The accommodating grooves 11 are provided on the intaglio roll 1 of the dispensing device. The intaglio roll 1 is provided on the second micro-adjustment platform 5. The feed amount controller includes a displacement sensor and a grating ruler. The relief roll 2 of the dispensing device is provided on the first micro-adjustment platform 7. The abrasion detection device is configured to detect abrasion values of the transferring protrusions 21 and send the abrasion values to the first feed amount controller 8. The first feed amount controller 8 is configured to detect spacings between the transferring protrusions 21 on the relief roll 2 and the planar bottom roll 3 and control the movement of the first micro-adjustment platform 7 according to a coating requirement and an abrasion degree to adjust the spacings between the transferring protrusions 21 on the relief roll 2 and the planar bottom roll 3. A first display and storage device (not shown in the figure) displays and stores values of adjusted spacings. The first driving control device is configured to drive the planar bottom roll 3 to rotate reversely relative to the relief roll 2 and drive the coating film 4 to move, such that the coating adhesive droplets 09 that cover the transferring end surfaces 211 of the transferring protrusions 21 is dripped onto the coating film 4 under the action of the tension difference to form coating points 9 on the coating film 4. Shapes of the coating points 9 correspond to the adjusted spacings between the transferring protrusions 21 and the planar bottom roll 3. The shapes of the coating points 9 each define a dimension that is a diameter and/or a height.

It is to be noted that after long-time use, the protrusions on the relief roll will be increased in diameter to affect the dispensing effect of the separator, and if the relief roll is abraded to a certain degree is replaced, the cost is also increased. In the embodiment, by detecting the abrasion degrees of the transferring protrusions and controlling the movement of the first micro-adjustment platform according to the coating requirement and the abrasion degrees to adjust the spacings between the transferring protrusions on the relief roll and the planar bottom roll, the shapes of the coating points on the coating film keep a desirable effect, which prevents the problem of cost increase for replacement arising from abrasions and deviations of the transferring protrusions on the relief roll in the prior art.

The specific process for forming the coating layers on the coating film with the dispensing control device is as follows:

First of all, the intaglio roll 1 and the relief roll 2 are driven to rotate reversely, such that the transferring protrusions 21 are sequentially inserted into the accommodating grooves 11 to bring the coating adhesive out of the accommodating grooves 11. Due to different viscosities and tension differences of the coating adhesive, coating adhesive droplets 09 covering the transferring end surfaces 211 of the transferring protrusions 21 are formed.

Then, feed amounts when the transferring protrusions 21 are inserted into the accommodating grooves 11 for accommodating the coating adhesive are detected and adjusted according to a coating requirement. Values of adjusted feed amounts are displayed and stored. Diameters and heights of the coating adhesive droplets 09 correspond to the adjusted feed amounts. The accommodating grooves 11 are provided on the intaglio roll 1 in the dispensing device.

At last, abrasion values of the transferring protrusions 21 are detected. Spacings between the transferring protrusions 21 on the relief roll 2 in the dispensing device and the planar bottom roll 3 are detected and adjusted according to the coating requirement and the abrasion values. Values B of adjusted spacings are displayed and stored. The coating adhesive droplets 09 that cover the transferring end surfaces 211 of the transferring protrusions 21 are dripped onto the coating film 4 under the action of the tension difference, thereby forming, on the coating film 4, first coating adhesive droplets each having a height between 1 μm and 50 μm and a diameter between 50 μm and 1,000 μm. The diameters and heights of the coating points 9 correspond to spacings between the adjusted transferring protrusions 21 and the planar bottom roll 3.

As shown in FIGS. 6A-6D, FIGS. 7A-7D, and FIGS. 8A-8D, the transferring protrusions 21 each may be a generatrix recessed frustum structure, a generatrix protruded frustum structure, a frustum structure, or a staircase structure. Preferably, the transferring end surfaces 211 of the transferring protrusions 21 are circular surfaces, and diameters d2 of the transferring end surfaces 211 fall into a range between 20 μm and 1 mm. When the dispensing device for an LIB separator is used to form the incompletely covered coating layers on the coating film, transferring of the coating adhesive is not affected by the small or large transferring end surfaces 211 of the transferring protrusions 21, and the coating adhesive on the anilox roll 1 is transferred conveniently. When the transferring protrusion 21 is the staircase structure, the transferring protrusion 21 includes a connecting base 2101 and a transferring boss 2102. The cross-sectional area of the transferring boss 2102 is less than that of the connecting base 2101. The transferring protrusion 21 has a smaller cross-sectional area at the transferring end surface 211, and the cross-sectional area at the transferring end surface 211 of the transferring protrusion 21 is minimal compared with other parts of the transferring protrusion 21, such that the transferring protrusion is conveniently inserted into the accommodating groove 11 when contacting the anilox roll 1 to transfer the coating adhesive on the anilox roll 1.

Preferably, the transferring boss 2102 is a cylindrical structure. The cylindrical structure has a height of h1≤200 μm. A ratio N of the height h1 of the cylindrical structure to the diameter d2 is less than or equal to 2.5. The connecting base 2101 is a frustum structure. By setting the ratio N of the height h1 of the cylindrical transferring boss 2102 to the diameter d2 as being less than or equal to 2.5, neither the transferring effect nor the subsequent coating effect is affected by the elongated transferring boss 2102 when the transferring protrusion 21 transfers the adhesive. In addition, the connecting base 2101 of the frustum structure can effectively support the transferring boss 2102 and facilitate manufacturing. The feed amount controller is configured to detect and control the spacing between the relief roll 2 and the anilox roll 1, thereby controlling the feed amounts when the transferring protrusions 21 on the relief roll 2 are inserted into the accommodating grooves 11 on the anilox roll 1. Preferably, the feed amount controller may be a grating ruler. The grating ruler as the feed amount controller is installed and operated simply and conveniently, has high detection and control precision, and facilitates the control of the operator on the thicknesses of the coating layers. Preferably, ratios Q of inner diameters d1 of the accommodating grooves 11 on the anilox roll 1 to diameters d2 of the transferring end surfaces of the transferring protrusions 21 on the relief roll 2 are greater than or equal to 150%. Areas of the transferring end surfaces of the transferring protrusions 21 are far less than the cross-sectional areas of the accommodating grooves 11, such that the transferring end surfaces of the transferring protrusions 21 are conveniently inserted into the accommodating grooves 11 on the anilox roll 1. With the tension of the coating adhesive, the coating adhesive is attached to the transferring ends of the transferring protrusions to form the spherical or ellipsoidal coating adhesive droplets 09. The coating adhesive droplets 09 do not squeeze the coating film but mainly drip onto the coating film under the action of the tension difference of the coating adhesive droplets 09 on different materials. By adjusting the tension of the coating adhesive and the sizes of the coating adhesive droplets 09, the thicknesses of the coating layers are adjusted, which is simple and convenient.

In addition, the specific process for forming the coating layers on the coating film with the dispensing method in the embodiment of the present disclosure is as follows:

First of all, the coating adhesive is coated in the accommodating grooves 11 on the rolling surface of the anilox roll 1, and the liquid film layers of uniform thickness are formed in the accommodating grooves 11 on the anilox roll 1. Preferably, excess liquid films can be removed by squeezing or scraping the coating adhesive on the rolling surface of the anilox roll 1 through a roller or a blade, thereby forming the liquid film layers of uniform thickness in anilox cells. In response to the roller, a rolling surface of the roller close to the anilox roll 1 contacts and squeezes the coating adhesive on the rolling surface of the anilox roll 1 to remove excess coating adhesive, thereby forming the liquid film layers of the uniform thickness in the anilox cells of the anilox roll 1 with the rotation of the anilox roll 1. In response to the blade, the blade is close to the rolling surface of the anilox roll 1. During the rotation of the anilox roll 1, the blade scrapes the coating adhesive on the rolling surface of the anilox roll 1 to remove excess coating adhesive, thereby forming the liquid film layers of uniform thickness in the anilox cells of the anilox roll 1. Likewise, the anilox roll can also be changed to a smooth roll with a large surface adhesive force or a textured roll. The thicknesses of the liquid film layers are adjusted as required by adjusting the spacing between the roller or the blade and the rolling surface of the smooth roll with the large surface adhesive force or the textured roll, which is simple and convenient.

Then, feed amounts when the transferring protrusions 21 on the relief roll 2 are inserted into the accommodating grooves 11 on the anilox roll 1 are adjusted with the feed amount controller according to a coating requirement, namely the spacings L between the transferring end surfaces 211 of the transferring protrusion 21 and the bottoms of the accommodating grooves 11 are adjusted. A drive device such as a drive motor is used to drive the anilox roll 1 and the relief roll 2 to rotate reversely, such that the transferring protrusions 21 on the relief roll 2 are sequentially inserted into the accommodating grooves 11 on the anilox roll 1 to bring the coating adhesive out of the accommodating grooves 11, thereby forming the coating adhesive droplets 09 covering the transferring end surfaces 211 of the transferring protrusion 21.

At last, the drive device is used to drive the planar bottom roll 3 to rotate reversely relative to the relief roll 2, such that the coating film 4 in the film passing gap 31 is driven to move along a direction k, and the coating adhesive droplets 09 on the transferring protrusions 21 of the relief roll 2 drip onto the coating film 4 to form coating points of the incompletely covered coating layers on the coating film 4. As shown in FIGS. 8A-8D, when the transferring protrusions 21 on the relief roll 2 are the generatrix recessed frustum structures, semi-ellipsoidal coating points 9 are formed on coating film 4.

When the dispensing device is used to form the coating layers on the coating film, a coating adhesive having a viscosity in the range between 300 Pa s and 15,000 Pa·s at room temperature is preferred. In this way, when the coating adhesive is transferred, the coating adhesive droplets having heights in the range between 1 μm and 50 μm, and diameters in the range between 50 μm and 1,000 μm can be formed on the transferring protrusion points, thereby forming the thick coating layers.

Figure 9:
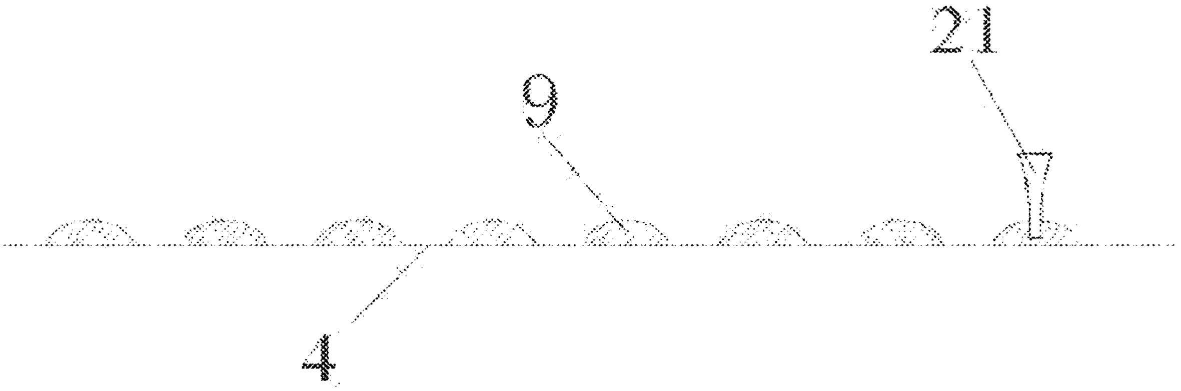
FIG. 9 is a schematic view of a coating layer prepared with the dispensing device when a transferring protrusion is a generatrix recessed frustum structure.

FIG. 9 is a schematic view of a coating layer prepared with the dispensing device when a transferring protrusion is a generatrix recessed frustum structure. As can be seen from FIG. 9, the transferring protrusion hardly contacts the separator (coating film), and the second coating adhesive droplet 09 is transferred mainly with the tension difference. The first coating adhesive droplet 9 is formed on the separator, and the formed first coating adhesive droplet 9 is approximately spherical or ellipsoidal.

Table 1 illustrates a comparison between the separator produced with the existing process and the separator produced with the method. The island spraying film is prepared by a fourth-generation rotary spraying production device, and the roll coating shrink film is prepared by a third-generation full-coating shrink production device. The parameters are described as follows: 1. A smaller surface density is an indication of a smaller usage of the material. 2. A higher penetration strength is an indication of better strength and a safer battery. 3. A larger conductivity is an indication of a quicker charge-discharge speed. 4. A smaller surface resistance is an indication of smoother penetration of a lithium ion. 5. Air permeability: the time that gas in a unit volume passes through the separator in a unit area; shorter time is an indication of better air permeability.

Table 2 illustrates a comparison between two dispensing technologies.

TABLE 1

| Parameter | Uniform dispensing film (the embodiment) | Roll coating shrink film | Island spraying film |
|---|---|---|---|
| Surface density (g/m$^2$) | 15.01 | 15.85 | 17.15 |
| Penetration strength (N) | 7.43 | 6.95 | 7.2 |
| Ionic conductivity (S/cm) | 12.7*10$^{-4}$ | 8.7*10$^{-4}$ | 9.1*10$^{-4}$ |
| Surface resistance (Ω) | 1.71 | 2.36 | 3.23 |
| Air permeability (s) | 235 | 333 | 286 |

TABLE 2

| | Initially researched coating method | Coating method in the embodiment of the present disclosure |
|---|---|---|
| Coating transferring mechanism | Flexible pressing<br>The relief roll must contact the separator | Tension difference<br>Droplets on the protrusions contact the separator or the protrusions contact the separator |
| Performance outcome | Thin coating<br>Recessed island points are formed in middles of the droplets | Coating is either thin or thick<br>Spherical droplets are formed when the protrusions do not contact the separator. When the protrusions contact the separator, the droplets are similar to those formed by flexible pressing |
| Microscopic view | The area of the boss of the relief roll is far greater than that of the groove | The area of the boss of the relief roll is less than that of the groove (d ≥ 2.5). |

What is claimed is:

1. A dispensing device for a lithium-ion battery (LIB) separator, comprising a coating adhesive transferring device, wherein the coating adhesive transferring device comprises an adhesive accommodating device and a relief roll; accommodating grooves for accommodating adhesives are provided on the adhesive accommodating device; transferring protrusions are arranged on a rolling surface of the relief roll; the transferring protrusions are configured to insert into corresponding ones of the accommodating grooves on the adhesive accommodating device to transfer a separator coating adhesive; the separator coating adhesive forms coating adhesive droplets covering transferring end surfaces of the transferring protrusions; a planar bottom roll rotates reversely relative to the adhesive accommodating device, such that a coating film is driven to move, and the coating adhesive droplets on the transferring protrusions drip onto the coating film to form incompletely covered coating layers on the coating film; and a dispensing control device including a first micro-adjustment platform, a first feed amount controller, a second micro-adjustment platform, and a second feed amount controller, wherein the relief roll is provided on the first micro-adjustment platform, and the adhesive accommodating device is provided on the second micro-adjustment platform; and wherein the transferring protrusions do not contact the separator.

2. The dispensing device for the LIB separator according to claim 1, further comprising a feed amount controller and the planar bottom roll, wherein the planar bottom roll is located under the coating adhesive transferring device; a film passing gap for allowing the coating film to pass through is provided between the planar bottom roll and the coating adhesive transferring device; and the second feed amount controller is configured to detect and control feed amounts when the transferring protrusions on the relief roll are inserted into the accommodating grooves on the adhesive accommodating device.

3. The dispensing device for the LIB separator according to claim 2, further comprising an application device, wherein the application device abuts against the adhesive accommodating device, such that the coating adhesive forms liquid film layers of a uniform thickness on a surface of the adhesive accommodating device.

4. The dispensing device for the LIB separator according to claim 3, wherein the application device comprises a roller or a blade, wherein the roller or the blade is configured to respectively squeeze or scrape the adhesive accommodating device.

5. The dispensing device for the LIB separator according to claim 1, wherein the adhesive accommodating device comprises an anilox roll, a textured roll, or a smooth roll.

6. The dispensing device for the LIB separator according to claim 1, wherein ratios Q of inner diameters d1 of the accommodating grooves to diameters d2 of the transferring end surfaces of the transferring protrusions are greater than or equal to 1.5.

7. The dispensing device for the LIB separator according to claim 6, wherein the transferring end surfaces of the transferring protrusions are circular surfaces; the transferring end surfaces have diameters d2 between 20 μm and 1 mm; and when the transferring protrusions are inserted into the accommodating grooves, the transferring end surfaces and bottoms of the accommodating grooves have spacings L between 20 μm and 250 μm.

8. The dispensing device for the LIB separator according to claim 7, wherein the transferring protrusions each are a generatrix recessed frustum structure, a generatrix protruded frustum structure, a first frustum structure, or a staircase structure.

9. The dispensing device for the LIB separator according to claim 8, wherein the staircase structure comprises a connecting base and a transferring boss; a cross-sectional area of the transferring boss is less than a cross-sectional area of the connecting base; the transferring boss is a cylindrical structure; the connecting base is a second frustum structure; the cylindrical structure has a height h1≤200 μm; and a ratio N of the height h1 of the cylindrical structure to the diameter d2 of each of the transferring end surfaces is less than or equal to 2.5.

10. The dispensing device for the LIB separator according to claim 1, wherein the coating adhesive droplets drip onto the coating film based on a tension difference between different materials.

11. The dispensing device for the LIB separator according to claim 10, wherein the relief roll and the coating film are made of the different materials.

12. The dispensing device for the LIB separator according to claim 10, wherein the coating adhesive droplets further drip onto the coating film under actions of gravities and centrifugal forces.

13. The dispensing device for the LIB separator according to claim 2, wherein the second feed amount controller comprises a grating ruler.

14. The dispensing device for the LIB separator according to claim 3, wherein the second feed amount controller comprises a grating ruler.

15. The dispensing device for the LIB separator according to claim 4, wherein the second feed amount controller comprises a grating ruler.

* * * * *